United States Patent
Jin et al.

(10) Patent No.: US 7,363,280 B2
(45) Date of Patent: *Apr. 22, 2008

(54) METHODS FOR MULTI-OBJECTIVE OPTIMIZATION USING EVOLUTIONARY ALGORITHMS

(75) Inventors: Yaochu Jin, Rodgau (DE); Bernhard Sendhoff, Obertshausen (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 402 days.

This patent is subject to a terminal disclaimer.

(21) Appl. No.: 10/007,906

(22) Filed: Nov. 9, 2001

(65) Prior Publication Data

US 2002/0099929 A1    Jul. 25, 2002

(30) Foreign Application Priority Data

Nov. 14, 2000    (EP)    .................................. 00124824

(51) Int. Cl.
*G06F 15/18*    (2006.01)
*G06F 17/00*    (2006.01)
*G06N 3/00*    (2006.01)
*G06N 3/12*    (2006.01)
*G06N 5/00*    (2006.01)

(52) U.S. Cl. .......................................... 706/13; 706/45
(58) Field of Classification Search ................. 706/45, 706/13, 37, 39, 19, 932
See application file for complete search history.

(56) References Cited

U.S. PATENT DOCUMENTS

| | | | |
|---|---|---|---|
| 5,136,686 A | 8/1992 | Koza | |
| 5,148,513 A | 9/1992 | Koza et al. | |
| 5,265,830 A * | 11/1993 | Allen | 244/213 |
| 5,319,781 A * | 6/1994 | Syswerda | 705/8 |
| 5,355,528 A * | 10/1994 | Roska et al. | 706/38 |
| 5,461,570 A * | 10/1995 | Wang et al. | 700/110 |
| 5,541,848 A * | 7/1996 | McCormack et al. | 700/213 |
| 5,724,258 A * | 3/1998 | Roffman | 702/108 |
| 5,819,244 A * | 10/1998 | Smith | 706/13 |
| 5,924,048 A * | 7/1999 | McCormack et al. | 702/13 |
| 6,285,968 B1 | 9/2001 | Motoyama et al. | |
| 6,292,763 B1 | 9/2001 | Dunbar et al. | |
| 6,449,603 B1 * | 9/2002 | Hunter | 706/15 |

(Continued)

OTHER PUBLICATIONS

Jin et al; On generating FC3 fuzzy rule systems from data using evolution strategies; IEEE Transactions on Systems, Man and Cybernetics Part B; vol. 29, Is. 6; Dec. 1999; pp. 829-845.*

(Continued)

*Primary Examiner*—David Vincent
*Assistant Examiner*—Benjamin Buss
(74) *Attorney, Agent, or Firm*—Fenwick & West LLP

(57) ABSTRACT

In the field of multi-objective optimization using evolutionary algorithms conventionally different objectives are aggregated and combined into one objective function using a fixed weight when more than one objective needs to be optimized. With such a weighted aggregation, only one solution can be obtained in one run. Therefore, according to the present invention two methods to change the weights systematically and dynamically during the evolutionary optimization are proposed. One method is to assign uniformly distributed weight to each individual in the population of the evolutionary algorithm. The other method is to change the weight periodically when the evolution proceeds. In this way a full set of Pareto solutions can be obtained in one single run.

17 Claims, 4 Drawing Sheets

U.S. PATENT DOCUMENTS

Figure 1:
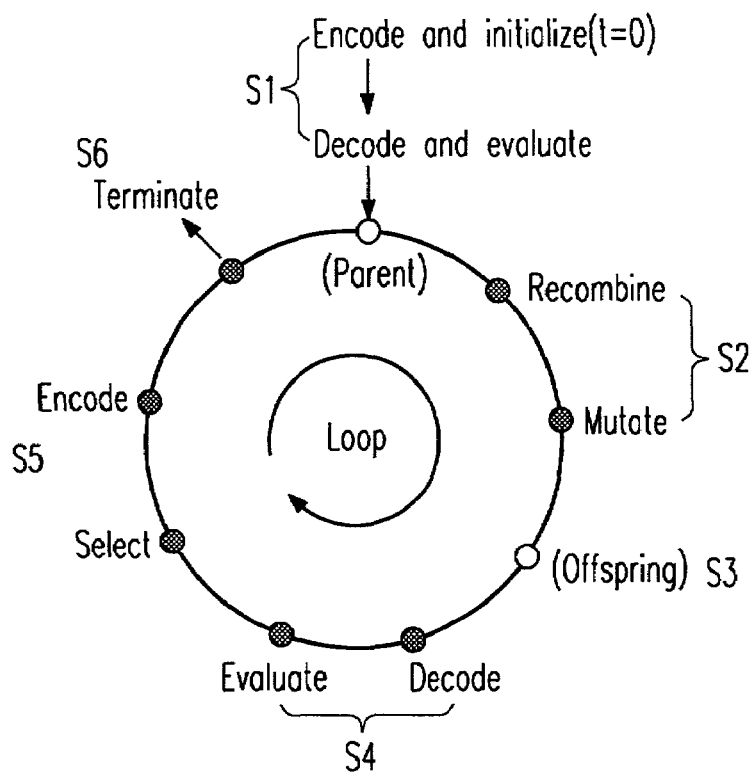

| | | | |
|---|---|---|---|
| 6,549,233 | B1 | 4/2003 | Martin |
| 6,578,018 | B1* | 6/2003 | Ulyanov ..................... 706/14 |
| 6,606,612 | B1* | 8/2003 | Rai et al. ..................... 706/15 |
| 6,662,167 | B1* | 12/2003 | Xiao ........................... 706/13 |
| 6,781,682 | B1 | 8/2004 | Kasai et al. |
| 7,043,462 | B2 | 5/2006 | Jin et al. |
| 2002/0138457 | A1* | 9/2002 | Jin et al. ..................... 706/26 |
| 2002/0165703 | A1 | 11/2002 | Olhofer et al. |
| 2004/0049472 | A1 | 3/2004 | Hayashi et al. |
| 2005/0209982 | A1 | 9/2005 | Jin et al. |

OTHER PUBLICATIONS

Sendhoff; Evolutionary optimised ontogenetic neural networks with incremental problem complexity during development; Proceedings of the 2000 Congress on Evolutionary Computation; vol. 2; Jul. 16-19, 2000; pp. 1443-1450.*

Agrez; Active power estimation by averaging of the DFT coefficients; Proceedings of the 17th IEEE Instrumentation and Measurement Technology Conference; vol. 2; May 1-4, 2000; pp. 630-635.*

Mitlöhner; Classifier systems and economic modeling; Proceedings of the conference on Designing the future; ACM SIGAPL APL Quote Quad; vol. 26, Is. 4; Jun. 1996.*

Clayton et al; Acoustic wavefield propagation using paraxial extrapolators; Proceedings of the third conference on Hypercube concurrent computers and applications; vol. 2; Jan. 1989.*

Li et al; Text enhancement in digital video using multiple frame integration; Proceedings of the seventh ACM international conference on Multimedia (Part 1); Oct. 1999.*

Crump; Numerical Inversion of Laplace Transforms Using a Fourier Series Approximation; Journal of the ACM (JACM); vol. 23 Is. 1; Jan 1976.*

Gupta et al; Automated test data generation using an iterative relaxation method; Proceedings of the 6th ACM SIGSOFT international symposium on Foundations of software engineering; ACM SIGSOFT Software Engineering Notes; vol. 23, Is. 6; Nov. 1998.*

Guerin; ObjectGarden; Evolving the Behavior of Agents via Natural Selection on Weights and Topologies of Neural Networks; May 1999; pp. 1-15.*

Dash et al; Genetic optimization of a self organizing fuzzy-neural network for load forecasting; IEEE Power Engineering Society Winter Meeting; vol. 2; Jan. 23-27, 2000; pp. 1011-1016.*

Mitlöhner; Classifier systems and economic modeling; Proceedings of the conference on Designing the future; ACM SIGAPL APL Quote Quad; vol. 26, Is. 4; Jun. 1996; pp. 77-86.*

Clayton et al; Acoustic wavefield propagation using paraxial extrapolators; Proceedings of the third conference on Hypercube concurrent computers and applications; vol. 2; Jan. 1989; pp. 1157-1175.*

Li et al; Text enhancement in digital video using multiple frame integration; Proceedings of the seventh ACM international conference on Multimedia (Part 1); Oct. 1999; pp. 19-22.*

Crump; Numerical Inversion of Laplace Transforms Using a Fourier Series Approximation; Journal of the ACM (JACM); vol. 23 Is. 1; Jan. 1976; pp. 89-96.*

Gupta et al; Automated test data generation using an iterative relaxation method; Proceedings of the 6th ACM SIGSOFT international symposium on Foundations of software engineering; ACM SIGSOFT Software Engineering Notes; vol. 23, Is. 6; Nov. 1998; pp. 231-244.*

Ishibuchi, H. et al., "Local Search Procedures In A Multi-Objective Genetic Local Search Algorithm For Scheduling Problems," IEEE, 1999, pp. 665-670.*

Mitlohner; Classifier systems and economic modeling; Proceedings of the conference on Designing the future; ACM SIGAPL APL Quote Quad; vol. 26, Is. 4; Jun. 1996; pp. 77-86.*

Knowles, J. et al., "The Pareto Archived Evolution Strategy: A New Baseline Algorithm For Pareto Multiobjective Optimisation," IEEE, 1999, pp. 98-105.*

Chen Y. et al., "Feature Subimage Extraction for Cephalogram Landmarking", Proc. of the 20th Annual International Conference on the IEEE Engineering in Medicine and Biology Society, Oct. 29, 1998, pp. 1414-1417.

European Search Report, EP Application No. 00124824.4, Jun. 14, 2001.

Grierson, D.E. et al., "Optimal Sizing, Geometrical and Topological Design Using a Genetic Algorithm", Structural Optimization, 1993, pp. 151-159, vol. 6.

Ishibuchi, H. et al., "Local Search Procedures In A Multi-Objective Genetic Local Search Algorithm For Scheduling Problems," IEEE, 1999, pp. 665-670.

Knowles, J. et al., "The Pareto Archived Evolution Strategy: A New Baseline Algorithm For Pareto Multiobjective Optimisation," IEEE, 1999, pp. 98-105.

Lohan, J.D. et al., "A Comparison Of Dynamic Fitness Schedules For Evolutionary Design Of Amplifiers," 6 pages.

Ratle, A., "Accelerating the Convergence of Evolutionary Algorithms by Fitness Landscape Approximation", Parallel Problem Solving from Nature—PPSN V. 5th International Conference Proceedings, Sep. 1998, pp. 87-96.

Ratle, A., "Optimal Sampling Strategies for Learning a Fitness Model", *Proc. of 1999 Congress on* Evolutionary Computation, Jul. 9, 1999, pp. 2078-2085, vol. 3.

Redmond, J., "Actuator Placement Based on Reachable Set Optimization for Expected Disturbance", Journal of Optimization Theory and Applications, Aug. 1996, pp. 279-300. vol. 90, No. 2.

Tuson, A. et al., "Adapting Operator Settings In Genetic Algorithms," Final Draft of The Paper Which Will Appear In *Evolutionary Computation*, Mar. 25, 1998, pp. 1-17.

Yu et al., "Genetic Algorithm Approach to Image Segmentation using Morphological Operations", Image Processing, ICIP 1998, IEEE, Oct. 1998, pp. 775-779, vol. 3.

Dasgupta, Dipankar et al., Evolutionary Algorithms in Engineering Applications, 1997, 3-23, Springer-Verlag.

Deb, K, Evolutionary Algorithms for Multi-Criterion Optimization in Engineering Design, In Miettinen et al, Evolutionary Algorithms in Engineering and Computer Science, 1999, pp. 135-161, John Wiley and Sons, Ltd, Chichester, UK.

Van Veldhuizen, David A. et al., Multiobjective Evolutionary Algorithms: Analyzing the State-of-the-Art, Evolutionary Computation, 2000, 125-147, vol. 8, No. 2, the MIT Press, Cambridge, MA.

Hruschka, E.R. et al., "Using a Clustering Genetic Algorithm for Rule Extraction from Artificial Neural Networks," IEEE, 2000, pp. 199-206.

Kim, H.S. et al., "An Efficient Genetic Algorithm with Less Fitness Evaluation by Clustering," IEEE, 2001, pp. 887-894.

Li, M. et al, "Hybrid Evolutionary Search Method Based on Clusters," IEEE Transactions on Pattern Analysis and Machine Intelligence, Aug. 2001, pp. 786-799, vol. 23, No. 8.

Zhou, Z.H. et al., "Genetic Algorithm Based Selective Neural Networks Ensemble," Proceedings of the 17th International Joint Conference on Artificial Intelligence, IEEE, 2001, pp. 797-802, vol. 2.

Back, T et al., "Evolutionary Computation: Comments on the History and Current State," IEEE Transactions on Evolutionary Computation, Apr. 1997, pp. 3-17, vol. 1, No. 1.

Back, T. et al., "A Survey of Evolution Strategies," Proc. of the 4th Int'l Conf. on Genetic Algorithms, Jul. 1991, pp. 2-9.

Carson, Y. et al., "Simulation Optimization: Methods and Applications," Proc. of the 29th Winter Simulation Conf., 1997, pp. 118-126.

European Search Report, EP Application No. 0124825, May 14, 2001, 3 pages.

European Search Report, EP Application No. 01104723, Aug. 22, 2001, 3 pages.

European Search Report, EP Application 04010194, Jun. 7, 2006, 3 pages.

Kim, H-S. et al., "An Efficient Genetic Algorithm with Less Fitness Evaluation by Clustering," Proceedings of the 2001 Congress on Evolutionary Computation, IEEE, May 27-30, 2001, pp. 887-894.

Koumoutsakos, P. et al., "Evolution Strategies for Parameter Optimization in Jet Flow Control," Center of Turbulence Research Annual Research Briefs, 1998.

Muller, S. et al., "Application of Machine Learning Algorithms to Flow Modeling and Optimization," Center of Turbulence Research Annual Research Briefs, 1999.

Pittman, J. et al., "Fitting Optimal Piecewise Linear Functions Using Genetic Algorithms," IEEE Transactions on Pattern Analysis and Machine Intelligence, Jul. 2000, pp. 701-718, vol. 22, Issue 7.

Sbalzarini, I, et al., "Evolutionary Optimization for Flow Experiments," Center of Turbulence Research Annual Research Briefs, 2000.

Srikanth, R. et al., "A Variable-Length Genetic Algorithm For Clustering And Classification," Pattern Recognition Letters, North-Holland Publ. Amsterdam, NL. vol. 16, No. 8, Aug. 1, 1995, pp. 789-800.

Weinert, K. et al., "discrete NURBS-Surface Approximation Using An evolutionaary Strategy," REIHE Cl 87/00, SFB 531, 2000, pp. 1-7.

* cited by examiner

METHODS FOR MULTI-OBJECTIVE OPTIMIZATION USING EVOLUTIONARY ALGORITHMS

This application is related to U.S. application Ser. No. 10/007,734, filed on Nov. 9, 2001 by Y. Jin and Dr. B. Sendhoff, titled "Approximate Fitness Function" and is related to U.S. application Ser. No. 10/501,378, is related to U.S. application Ser. No. 11/501,573 filed on Aug. 8, 2006, and is related to U.S. Pat. No. 7,243,056, and is related to U.S. application Ser. No. 11/042,991, and is related to U.S. application Ser. No. 11/033,767, and is related to U.S. application Ser. No. 11/517,135.

The present invention relates to a method for the optimization of multi-objective problems using evolutionary algorithms as well as to a computer software program product for implementing such a method.

The background of the present invention thereby is the field of evolution strategy. Therefore with reference to FIG. 1 at first the known cycle of an evolutionary algorithm will be explained.

In a step 1 the object parameters to be optimized are encoded in a string called individual. A plurality of such individuals comprising the initial parent generation is then generated and the quality (fitness) of each individual in the parent generation is evaluated. In a step S2 the parents are reproduced by applying genetic operators called mutation and recombination. Thus, a new generation is reproduced in step S3, which is called the offspring generation. The quality of the offspring individuals is evaluated using a fitness function that is the objective of the optimization in step S4. Finally, depending on the calculated quality value, step S5 selects, possibly stochastically, the best offspring individuals (survival of the fittest) which are used as parents for the next generation cycle if the termination condition in step S6 is not satisfied.

Before evaluating the quality of each individual, decoding may be needed depending on the encoding scheme used in the evolutionary algorithm. Note that the steps S2, S3, S4, S5 and S6 are cyclically repeated until the condition for termination of the optimization in step S6 is satisfied.

The algorithm of this evolutionary optimization can be expressed by the following pseudo-code:

```
t:=0
encode and initialize P(0)
decode and evaluate P(0)
do
   recombine P(t)
   mutate P(t)
   decode P(t)
   evaluate P(t)
   P(t+1)=select P(t)
   encode P(t+1)
   t:=t+1
until terminate
```

Such evolutionary algorithms are known to be robust optimizers that are well suitable for discontinuous and multi-modal objective functions. Therefore, evolutionary algorithms have successfully been applied for example to mechanical and aerodynamic optimization problems, including preliminary turbine design, turbine blade design, multi-disciplinary rotor blade design, multi-disciplinary wing platform design and a military airframe preliminary design.

Details on evolutionary algorithms can be found for example in Dasgupta et al., "Evolutionary Algorithms in Engineering Applications", Springer-Verlag, 1997 and Miettinen et al, "Evolutionary Algorithms in Engineering and Computer Science", John Wiley and Sons, 1999.

In the framework of the present invention the evolutionary algorithms are applied to the simultaneous optimization of multiple objectives, which is a typical feature of practical engineering and design problems. The principle of multi-criterion optimization is different from that in a single-objective optimization. In single-objective optimization, the goal is to find the best design solution, which corresponds to the minimum or maximum value of the objective function. On the contrary, in a multi-criterion optimization with conflicting objectives, there is no single optimal solution. The interaction among different objectives gives rise to a set of compromised solutions known as the Pareto-optimal solutions. A definition of Pareto optimal and Pareto front can be found in "Multiobjective evolutionary algorithms: Analyzing the state-of-the-art", D. A. Van Veldheizen and G. B. Lamont, Evolutionary Computation, 8(2), pp. 125-147, 2000. Since none of these Pareto-optimal solutions can be identified as better than others without any further consideration, the goal in a multi-criterion optimization is to find as many Pareto-optimal solutions as possible. Once such solutions are found, it usually requires a higher-level decision-making with other considerations to choose one of them for implementation.

There are two objectives in a multi-criterion optimization: (i) find solutions close to the true Pareto-optimal solutions and (ii) find solutions that are widely different from each other. The first task is desired to satisfy optimality conditions in the obtained solutions. The second task is desired to have no bias towards any particular objective function.

In dealing with multi-criterion optimization problems, classical search and optimization methods are not efficient, simply because (i) most of them cannot find multiple solutions in a single run, thereby requiring them to be applied as many times as the number of desired Pareto-optimal solutions, (ii) multiple application of these methods do not guarantee finding widely different Pareto-optimal solutions, and (iii) most of them cannot efficiently handle problems with discrete variables and problems having multiple optimal solutions. On the contrary, the studies on evolutionary search algorithms, over the past few years, have shown that these methods can be efficiently used to eliminate most of the above difficulties of classical methods. Since they use a population of solutions in their search, multiple Pareto-optimal solutions can, in principle, be found in one single run. The use of diversity-preserving mechanisms can be added to the evolutionary search algorithms to find widely different Pareto-optimal solutions.

A large number of evolutionary multi-objective algorithms (EMOA) have been proposed. So far, there are three main approaches to evolutionary multi-objective optimization, namely, aggregation approaches, population-based non-Pareto approaches and Pareto-based approaches. In the recent years, the Pareto-based approaches have been gaining increasing attention in the evolutionary computation community and several successful algorithms have been proposed. Unfortunately, the Pareto-based approaches are often very time-consuming.

Despite their weaknesses, the aggregation approaches are very easy to implement and computationally efficient. Usually, aggregation approaches can provide only one Pareto-solution if the weights are fixed using problem-specific prior knowledge. However, it is also possible to find more than one Pareto solutions using this method by changing the weights during optimization. The weights of the different objectives are encoded in the chromosome to obtain more than one Pareto solutions. Phenotypic fitness sharing is used to keep the diversity of the weight combinations and mating restrictions are required so that the algorithm can work properly.

Most of the EMOAs take advantage of genetic algorithms and relatively less attention has been paid to evolution strategies. There are a small number of papers that use evolution strategies based on either the population-based non-Pareto or the Pareto-based approach.

Therefore, it is the target of the present invention to develop a technique for a multi-objective optimization using evolutionary algorithms with a reduced computational effort.

This target is achieved by means of the features of the independent claims. The dependent claims develop further the central idea of the present invention.

To approximate the Pareto front instead of a single Pareto solution, the weight for each objective is changed systematically. One method is to distribute the weights uniformly among the individuals in the population. A further method is to periodically change the weights with the process of the evolution. Although these methods seem to be very simple, they have proved to be working effectively for two-objective optimization problems. Both methods work well on low-dimensional problems. However, for high-dimensional problems, the second method outperforms the first one. On the other hand, it also depends on the performance of the evolution strategy. The evolution strategy with Rotation Matrix Adaptation can give better performance than the standard evolution strategy. At the same time, the evolution strategy with Covariance Matrix Adaptation provides very good results on smooth, high-dimensional problems, but its performance degrades seriously on problems with discontinuous and non-convex Pareto-optimal front.

According to a first aspect of the present invention a method for the optimization of multi-objective problems using evolutionary algorithms is proposed. At first an initial population is set up as parents. Then the parents are reproduced to create a plurality of offspring individuals. The quality of the offspring individuals is evaluated by means of a fitness function. The fitness function is composed of the sum of weighted sub-functions that represent one of the objectives. Finally, the offspring individuals having the highest evaluated quality value are selected as parents. This cycle is repeated until an individual is found that has the prescribed quality. According to the present invention the weights for the sub-functions can be dynamically and systematically changed during the optimization process.

SUMMARY OF THE INVENTION

According to a first embodiment the weights can be randomly redistributed among the different offspring individuals in each generation for each generation cycle.

According to a second embodiment the weights can be changed periodically and dynamically with the process of optimization. Thereby, each offspring can have the same weight in the same generation and the periodic change can have the shape of a sign function applied on the generation number.

Pareto solutions found as optimal solutions for a multi-objective problem can be recorded in an archive.

According to a further aspect of the present invention a computer software program product is proposed which implements a method as set forth above when run on a computing device. In one embodiment the methods set forth herein are implemented by a computer program stored on a computer readable medium.

Figures 2, 3:
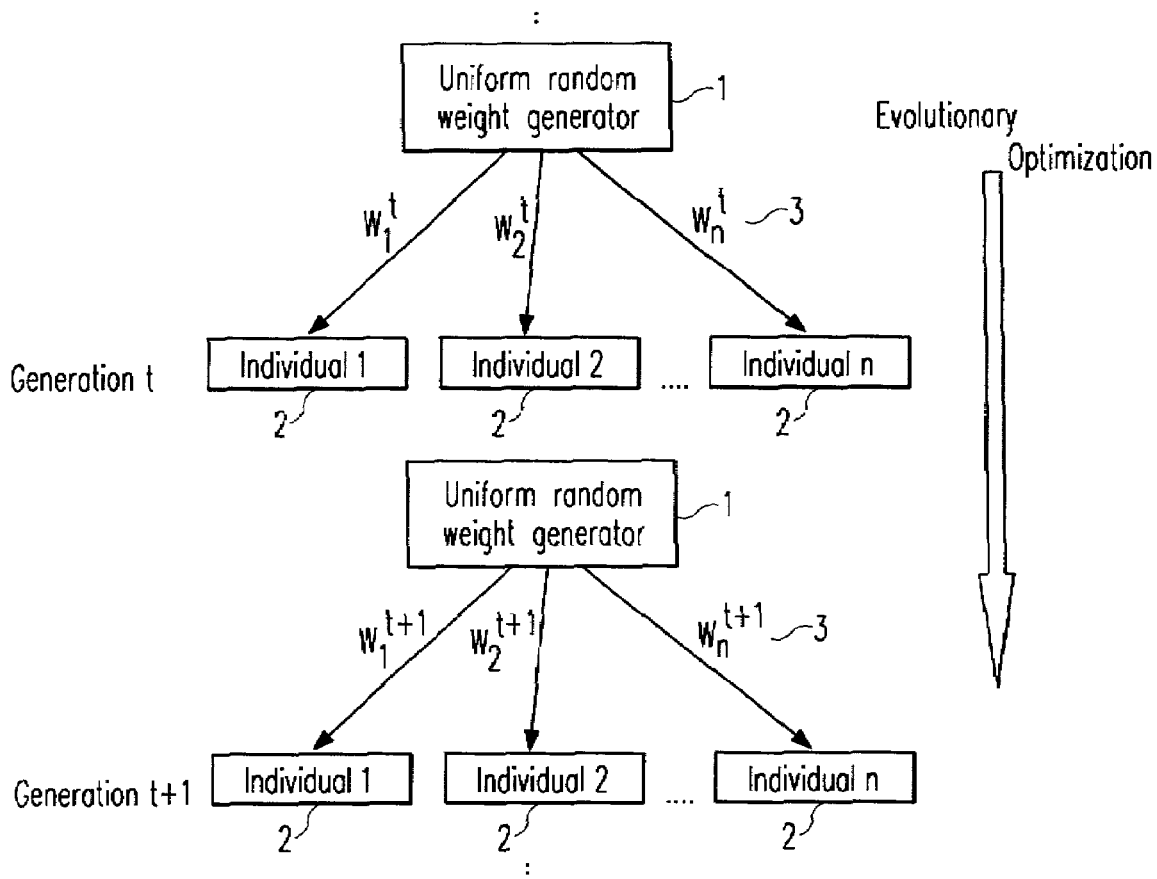
Figure 4:
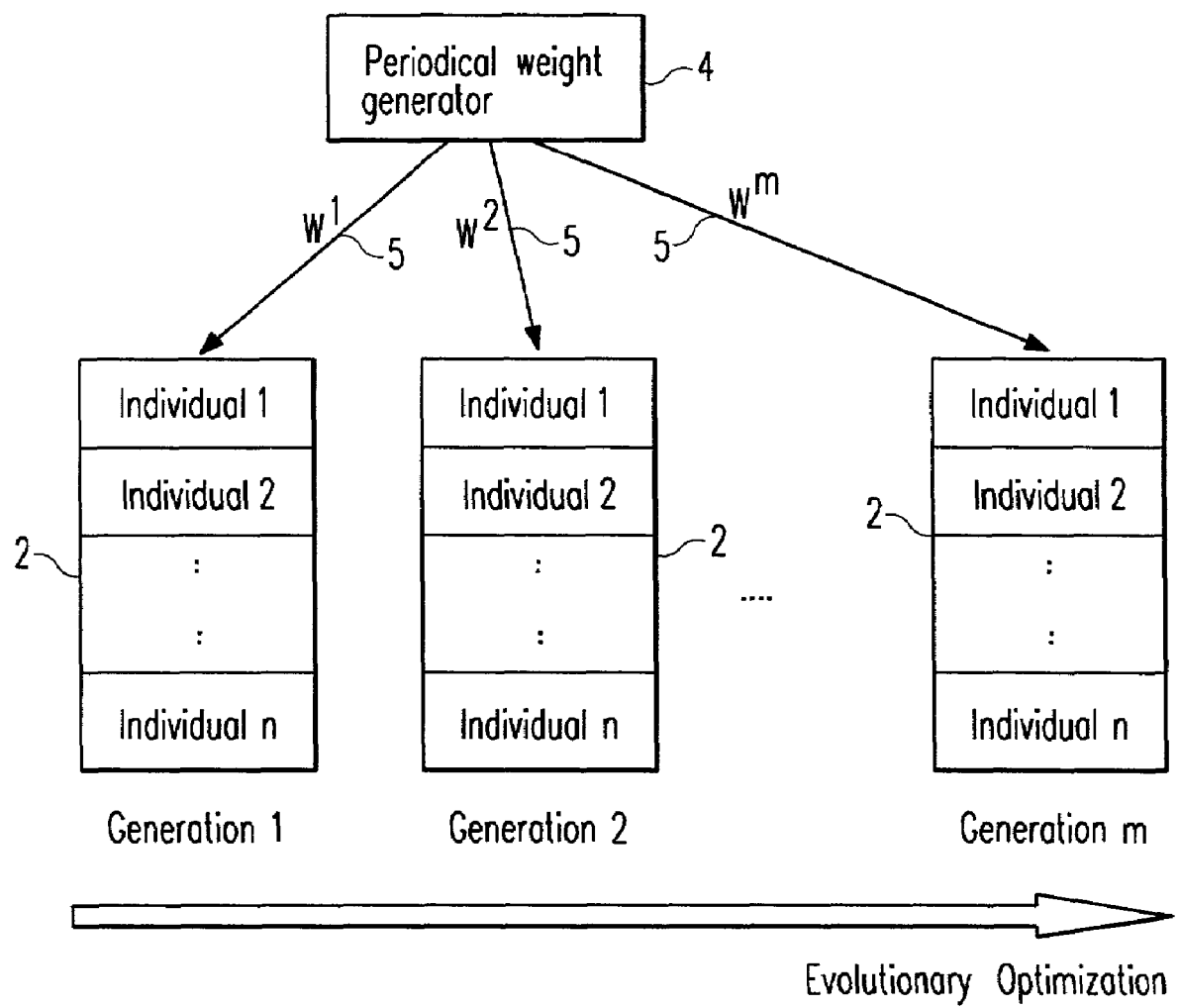
Figure 5:
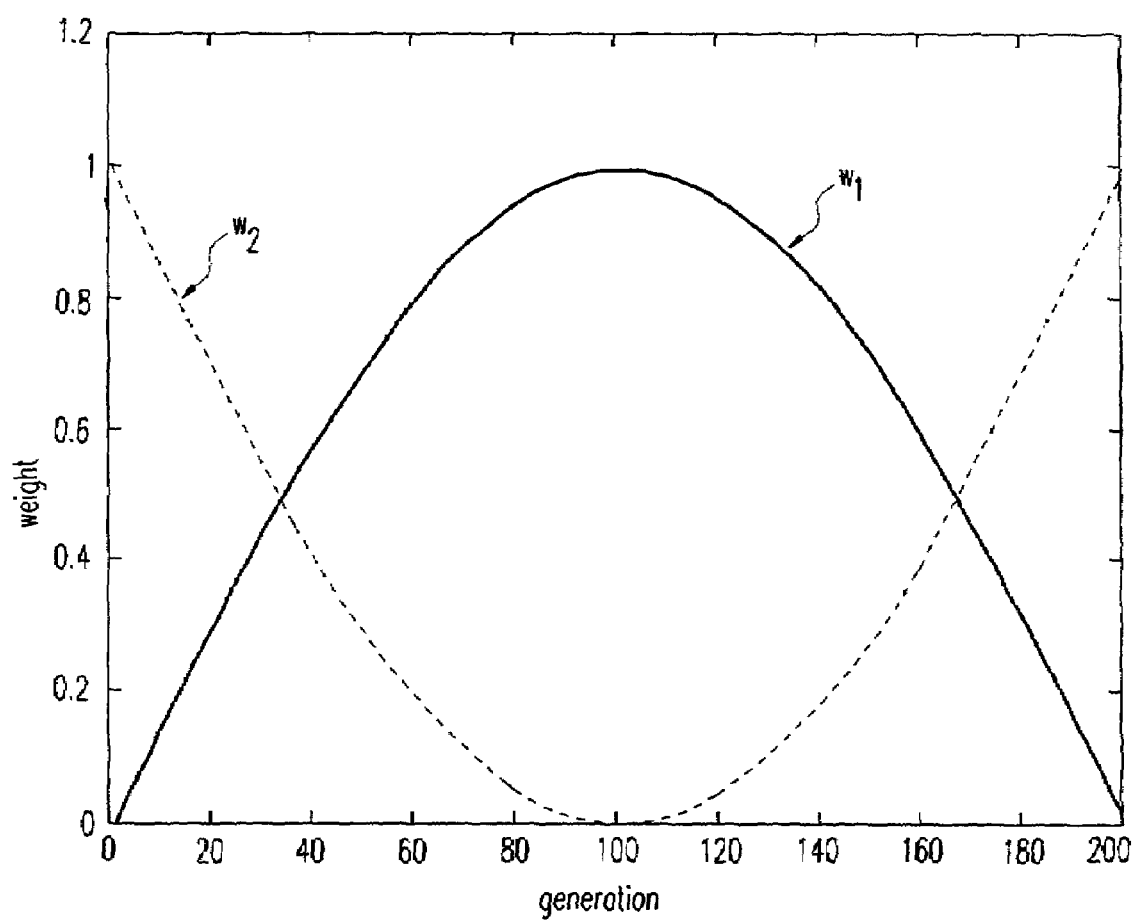

Further advantages, features and objects of the present invention will become evident for those who are skilled in the art when reading the following description of an embodiment of the present invention taken in conjunction with the figures of the enclosed drawings:

FIG. 1 shows a cycle of an evolution strategy,

FIG. 2 shows the generation of periodically adapted weights of sub-functions of the fitness function, FIG. 3 shows a graphical representation of the periodically adapted weights of sub-functions of the fitness function, FIG. 4 shows the generation of uniformly and randomly distributed weights, and FIG. 5 shows a mathematical representation of the generation of uniformly and randomly distributed weights.

DETAILED DESCRIPTION OF THE PREFERRED EMBODIMENTS

In the standard evolution strategy, the mutation of the objective parameters is carried out by adding an $N(0,\sigma_i^2)$ distributed random number. The step size $\sigma_i$ is also encoded into the genotype and subject to mutation. A standard evolution strategy can be described as follows:

$$x(t)=x(t-1)+\tilde{z} \qquad (1)$$

$$\sigma_i(t)=\sigma_i(t-1)exp(r'z)exp(rz_i) \qquad (2)$$

where x is an n-dimensional parameters to be optimized, $\tilde{z}$ is an n-dimensional random number vector with $\tilde{z} \sim N(0,\sigma(t)^2)$, z and $z_i$ are normally distributed random numbers with z, $z_i$N(0,1) r,r' and $\sigma_i$ are the strategy parameters, where $\sigma_i$ is mutated as in equation (2) and r, r' are constants as follows:

$$r=(\sqrt{2\sqrt{n}})^{-1};\ r'=(\sqrt{2n})^{-1} \qquad (3)$$

There are several extensions to the above standard evolution strategy (ES). In the present description an ES with Rotation Matrix Adaptation and an ES with Covariance Matrix Adaptation as well as the standard ES are used to show the effectiveness of the proposed multi-objective algorithms using different evolution strategies.

Two main different selection schemes are available in evolution strategies. Suppose there are μ and λ individuals in the parent and offspring populations, respectively, usually $\mu \leq \lambda$. One selection method is to select the μ parent individuals only from the λ offspring, which is usually denoted as (μ,λ)-ES. If the μ parent individuals are selected from a combination of the μ parent individuals, the algorithm is noted as (μ+λ)-ES.

For the sake of clarity two objective problems are considered although they can be extended to problems with more than two objectives. For a conventional aggregation method, the fitness function is the weighted sum of the two different objectives:

$$Fitness=w_1f_1+w_2f_2 \qquad (4)$$

where $w_1$ and $w_2$ are two constants determined using a prior knowledge about the problem. It is clear that by using a pair of fixed weights, only one Pareto solution can be obtained.

If the algorithm is run so many times that every weight combination is exhausted, then every Pareto solution consisting of the Pareto front is obtained. Note that theoretically, Pareto solutions located in the concave region of the Pareto front can not be obtained by an aggregation method. However, it is impractical to run the evolutionary algorithm so many times to exhaust all the weight combinations. Since population based optimization is used, advantage of the population is taken. If the different weight combinations can be distributed among the individuals, the population may be able to approach the Pareto front with the process of the evolution.

Random Distribution of Weights within a Population

FIG. 2 shows a first embodiment for adaptively distributing weights. A uniform random weight generator 1 generates in each generation t, t+1, . . . different weights 3 for the individuals 2 of each generation. Therefore for each generation t, t+1 of the evolutionary optimization a number n of different weights is generated, wherein the number of weights corresponds to the number n of individuals 2 in each generation.

In the following the first embodiment of the present invention will be explained: Suppose the $(\mu, \lambda)$–ES is used, then the weight combinations can be distributed uniformly among the $\lambda$ individuals in the offspring population. Let $$w_1^i(t) = \text{random}(\lambda+1)/\lambda \quad (5)$$

$$w_2^i(t) = 1.0 - w_1^i(t) \quad (6)$$

where i=1, 2, . . . $\lambda$, t is the index for generation number, function random ($\lambda$+1) generates a uniformly distributed number between 0 and $\lambda$. In this way, one can get a uniformly distributed random weight combination $(w_1^i, w_2^i)$ among the individuals, where $0 \leq w_1^i, w_2^i \leq 1$.

This algorithm is also represented in FIG. 3. Note that an individual may have a different weight combination in different generations.

Generation-Based Periodical Variation of the Weights

Instead of the randomly distributed weight combination of the above first embodiment, according to a second embodiment of the present invention the use of a weight combination that is changed gradually and periodically with the process of the evaluation is proposed.

FIG. 4 shows schematically a structure for implementing said second embodiment of the present invention. As shown a periodic weight generator 4 generates different weights 5 for the different generations of individuals 2. However, all individuals 2 of the same generation use the identical weight 5 (in contrast to the first embodiment).

This can be explained mathematically as follows:

$$w_1(t) = |\sin(2\pi t/F)| [w_1(t) = |\sin(2\pi t/F)|] \quad (7)$$

$$w_2(t) = 1.0 - w_1(t) \quad (8)$$

where t is the number of generation, |•| produces the absolute value of •. One can see from equation (7) that $w_1(t)$ changes from 0 to 1 periodically. FIG. 5 illustrates this periodic (sine) evolution of the weights during the evolutionary optimization. F is used to adjust the frequency of weight change.

The results of the algorithm are not very sensitive to F, although it is reasonable to let the weight change from 0 to 1 twice. Notice that in this case, all individuals have the same weight combination in the same generation.

An Archive of Pareto Solutions

In the algorithms explained above, the population is not able to keep all the found Pareto solutions, although it is able to approach the Pareto front dynamically. Therefore, it is necessary to record the Pareto solutions that are found so far. The pseudo-code for building the archive can be listed as follows:

For each individual o in the offspring population
    If o dominates an individual in the parent population p, and
    if o is not dominated by any solutions in the archive, and
    if o is not similar to any solutions in the archive, and
        if the archive is not full, add o to the archive
        else if o dominates any solution in the archive a, replace a with o
        else if any solution $a_1$ in the archive dominates another solution $a_2$, replace $a_2$ with o
        else discard o
    else discard o
For each solution in the archive
    If solution $a_1$ dominates $a_2$
    remove $a_2$ The similarity is measured by the Euclidean distance in the fitness space. Note furthermore that a solution $a_1$ is said to dominate the other solution $a_2$, if both the following conditions are true:

1. The solution $a_1$ is not worse than $a_2$ in all objectives, and
2. the solution $a_1$ is strictly better than $a_2$ in at least one objective.

Many technical, industrial and business applications are possible for evolutionary optimization. Examples for applications can be found in Dasgupta et al., "Evolutionary Algorithms in Engineering Applications", Springer-Verlag, 1997, and Miettinnen et al., "Evolutionary Algorithms in Engineering and Computer Science", John Wiley and Sons, 1999. One such application is to optimize an aerodynamic body using a pressure loss and an outlet angle calculated by a Navier-Stokes-solver and geometric constraints.

What is claimed is:

1. A computer-implemented method for optimizing multi-objective engineering or design problems using evolutionary algorithms, the method comprising the steps of:
    (a) setting up an initial population of individuals as parents, the individuals encoding object parameters to be optimized wherein said object parameters represent engineering or design characteristics including physical characteristics;
    (b) reproducing the parents to create a plurality of offspring individuals;
    (c) evaluating a quality of the offspring individuals by means of a fitness function;
    (d) wherein the fitness function includes a sum of weighted sub-functions that represent an objective, said weights for the sub-functions are changed dynamically during the optimization of the multi-objective engineering or design problems;
    (e) selecting one or more offspring having a highest evaluated quality value as parents for a next generation corresponding to a next evolution cycle, wherein said weights for the sub-functions are changed according to a periodic function during the optimization wherein a value of said weights repeats periodically according to said periodic function;
    (f) repeating steps (a)-(e) until a termination condition for the optimization is satisfied; and
    (g) outputting said weight values to a computer readable medium for use in the design of at least one of an aerodynamic body, a physical object, or a heat exchange wall.

2. The method of claim 1, wherein each offspring has a same weight in a same generation.

3. The method of claim 1, wherein the weights for the sub-functions are changed gradually between 0 and 1 with the process of optimization of multi-objective problems.

4. The method of claim 3, wherein the periodic change has a shape of a sine function applied on a generation number representing a number of the generation.

5. The method of claim 1 further comprising the step of:
recording, in a computer readable archive, Pareto solutions found as optimal solutions for a multi-objective problem.

6. The method of claim 1, wherein a pressure loss and an outlet angle calculated by a Navier-Stokes-solver and geometric constraints are objectives in the multi-objective problems that are used to optimize an aerodynamic body, wherein said aerodynamic body is the engineering or design problem that is optimized.

7. A computer program stored in a computer readable medium for performing the method of:
setting up an initial population of individuals as parents, the individuals encoding object parameters to be optimized wherein said object parameters represent engineering or design characteristics including physical characteristics;
(a) reproducing the parents to create a plurality of offspring individuals;
(b) evaluating a quality of the offspring individuals by means of a fitness function;
(c) wherein the fitness function includes a sum of weighted sub-functions that represent an objective, said weights for the sub-functions are changed dynamically during the optimization of multi-objective problems;
(d) selecting one or more offspring having a highest evaluated quality value as parents for a next generation corresponding to a next evolution cycle, wherein said weights for the sub-functions are changed according to a periodic function during the optimization wherein a value of said weights repeats periodically according to said periodic function;
(e) selecting one or more offspring having a highest evaluated quality value as parents for a next generation corresponding to a next evolution cycle, wherein said weights for the sub-functions are changed according to a periodic function during the optimization wherein a value of said weights repeats periodically according to said periodic function;
wherein a pressure loss and an outlet angle calculated by a Navier-Stokes-solver and geometric constraints are objectives in the multi-objective problems that are used to optimize an aerodynamic body;
(f) repeating steps (a)-(e) until a termination condition for the optimization is satisfied; and
(g) outputting said weight values to a computer readable medium for use in the design of at least one of an aerodynamic body, a physical object, or a heat exchange wall.

8. A computer-implemented method for optimizing an aerodynamic body represented by multi-objective problems using evolutionary algorithms, the method comprising the steps of:
(a) setting up an initial population of individuals as parents, the individuals encoding object parameters to be optimized wherein said object parameters represent characteristics of the aerodynamic body;
(b) reproducing the parents to create a plurality of offspring individuals;
(c) evaluating a quality of the offspring individuals by means of a fitness function;
(d) wherein the fitness function includes a sum of weighted sub-functions that represent an objective, said weights for the sub-functions are changed dynamically during the optimization of multi-objective engineering or design problems;
(e) selecting one or more offspring having a highest evaluated quality value as parents for a next generation corresponding to a next evolution cycle, wherein said weights for the sub-functions are changed according to a periodic function during the optimization wherein a value of said weights repeats periodically according to said periodic function;
(f) repeating steps (a)-(e) until a termination condition for the optimization is satisfied; and
(g) outputting said weight values to a computer readable medium for use in the design of at least one of an aerodynamic body, a physical object, or a heat exchange wall.

9. The method of claim 8, wherein each offspring has a same weight in a same generation.

10. The method of claim 8, wherein the weights for the sub-functions are changed gradually between 0 and 1 with the process of optimization of multi-objective problems.

11. The method of claim 8, wherein the periodic change has a shape of a sine function applied on a generation number representing a number of the generation.

12. The method of claim 8, further comprising the step of:
recording, in a computer readable archive, Pareto solutions found as optimal solutions for a multi-objective problem.

13. The method of claim 8, wherein a pressure loss and an outlet angle calculated by a Navier-Stokes-solver and geometric constraints are objectives in the multi-objective problems that are used to optimize the aerodynamic body.

14. A computer-implemented method for optimizing multi-objective engineering or design problems using evolutionary algorithms, the method comprising the steps of:
(a) setting up an initial population of individuals as parents, the individuals encoding object parameters to be optimized wherein said object parameters represent engineering or design characteristics including physical characteristics;
(b) reproducing the parents to create a plurality of offspring individuals;
(c) evaluating a quality of the offspring individuals by means of a fitness function;
(d) wherein the fitness function includes a sum of weighted sub-functions that represent an objective, said weights for the sub-functions are changed dynamically during the optimization of the multi-objective engineering or design problems;
(e) selecting one or more offspring having a highest evaluated quality value as parents for a next generation corresponding to a next evolution cycle, wherein said weights for the sub-functions are changed according to a periodic function during the optimization wherein a value of said weights repeats periodically according to said periodic function;
(f) repeating steps (a)-(e) until a termination condition for the optimization is satisfied; and
(g) recording, in a computer readable medium, Pareto solutions found as optimal solutions for a multi-objective problem.

15. The method of claim 14, wherein each offspring has a same weight in a same generation.

16. The method of claim 14, wherein the weights for the sub-functions are changed gradually between 0 and 1 with the process of optimization of multi-objective problems.

17. The method of claim 14, wherein the periodic function has a shape of a sine function applied on a generation number representing a number of the generation.

* * * * *